United States Patent
Agirman et al.

(10) Patent No.: US 9,586,789 B2
(45) Date of Patent: Mar. 7, 2017

(54) ELEVATOR BRAKING IN A BATTERY POWERED ELEVATOR SYSTEM

(71) Applicant: Otis Elevator Company, Farmington, CT (US)

(72) Inventors: Ismail Agirman, Southington, CT (US); Daryl J. Marvin, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 14/911,378

(22) PCT Filed: Aug. 13, 2013

(86) PCT No.: PCT/US2013/054713
§ 371 (c)(1),
(2) Date: Feb. 10, 2016

(87) PCT Pub. No.: WO2015/023263
PCT Pub. Date: Feb. 19, 2015

(65) Prior Publication Data
US 2016/0194179 A1    Jul. 7, 2016

(51) Int. Cl.
*B66B 1/32* (2006.01)
*B66B 1/30* (2006.01)
*H02P 3/18* (2006.01)
*H02P 27/06* (2006.01)

(52) U.S. Cl.
CPC ............... *B66B 1/32* (2013.01); *H02P 3/18* (2013.01); *H02P 27/06* (2013.01)

(58) Field of Classification Search
CPC ... B66B 1/32; B66B 1/306; H02P 3/18; H02P 27/06
See application file for complete search history.

(56) References Cited

U.S. PATENT DOCUMENTS

| | | | | |
|---|---|---|---|---|
| 4,908,563 A | * | 3/1990 | Suur-Askola | H02P 3/24 318/760 |
| 5,847,533 A | | 12/1998 | Hakala et al. | |
| 6,118,241 A | | 9/2000 | Kazlauskas | |
| 6,566,832 B2 | * | 5/2003 | Ataee | G11B 21/12 318/453 |
| 7,106,015 B2 | * | 9/2006 | Muroi | B41J 19/202 318/376 |
| 7,372,227 B2 | | 5/2008 | Rainer et al. | |

(Continued)

FOREIGN PATENT DOCUMENTS

JP    2007153574 A    6/2007

OTHER PUBLICATIONS

International Search Report and Written Opinion for application PCT/US2013/054713 mailed Apr. 21, 2014, 11 pages.

*Primary Examiner* — Robert W Horn
(74) *Attorney, Agent, or Firm* — Cantor Colburn LLP

(57) ABSTRACT

An elevator system includes a battery; a machine having a motor to impart motion to an elevator car; an inverter having a plurality of switches to convert DC power from the battery to AC power for the machine in a motoring mode; a speed sensor coupled to the machine, the speed sensor to generate a speed signal indicative of machine speed; and a controller to apply braking signals to a group of the switches in a braking mode, the braking signals having a duty cycle in response to the speed signal.

15 Claims, 4 Drawing Sheets

(56) References Cited

U.S. PATENT DOCUMENTS

| | | | | |
|---|---|---|---|---|
| 8,030,861 B2* | 10/2011 | Hoogzaad | ............... | H02P 23/20 |
| | | | | 318/376 |
| 9,350,268 B2* | 5/2016 | Eberlein | .................. | B60L 3/04 |
| 2001/0017243 A1 | 8/2001 | Tajima et al. | | |
| 2008/0000726 A1 | 1/2008 | Robledo et al. | | |
| 2010/0181947 A1* | 7/2010 | Hoogzaad | ................ | H02P 6/34 |
| | | | | 318/400.01 |
| 2011/0247900 A1 | 10/2011 | Blasko et al. | | |
| 2012/0013278 A1 | 1/2012 | Hanlon et al. | | |
| 2012/0261217 A1 | 10/2012 | Agirman et al. | | |
| 2013/0264983 A1* | 10/2013 | Okumura | ........... | H02P 23/0045 |
| | | | | 318/400.26 |
| 2013/0271046 A1* | 10/2013 | Sussman | ............. | B25J 19/0004 |
| | | | | 318/379 |
| 2013/0284789 A1* | 10/2013 | Smith | ................. | A61B 17/115 |
| | | | | 227/175.1 |
| 2014/0001987 A1* | 1/2014 | Okada | ...................... | B60L 7/16 |
| | | | | 318/370 |
| 2015/0203328 A1* | 7/2015 | Horbrugger | ............ | B66B 1/302 |
| | | | | 187/290 |
| 2015/0375959 A1* | 12/2015 | Agirman | ................ | B66B 1/302 |
| | | | | 187/247 |
| 2016/0194179 A1* | 7/2016 | Agirman | ................... | B66B 1/32 |
| | | | | 187/289 |

* cited by examiner

ELEVATOR BRAKING IN A BATTERY POWERED ELEVATOR SYSTEM

FIELD OF INVENTION

The subject matter disclosed herein relates generally to the field of elevator systems, and more particularly, to elevator braking in a battery powered elevator system.

BACKGROUND

Battery powered elevator systems employ a battery as a power source to an elevator machine that imparts motion to the elevator car. A drive unit containing an inverter is typically connected between the battery and the machine. In motoring mode, the inverter converts DC power from the battery to AC drive signals for the machine. In regenerative mode, the inverter converts AC power from the machine to DC power for charging the battery.

Existing elevator systems employ a braking resistor and braking relay to connect the braking resistor across the inverter to provide braking to the machine. The braking resistor and braking relay add cost and complexity to the elevator system.

SUMMARY

According to an exemplary embodiment, an elevator system includes a battery; a machine having a motor to impart motion to an elevator car; an inverter having a plurality of switches to convert DC power from the battery to AC power for the machine in a motoring mode; a speed sensor coupled to the machine, the speed sensor to generate a speed signal indicative of machine speed; and a controller to apply braking signals to a group of the switches in a braking mode, the braking signals having a duty cycle in response to the speed signal.

According to another exemplary embodiment, a method of controlling an elevator system, having a machine that imparts motion to an elevator car and a battery, includes: determining if a braking mode has been entered; in braking mode, opening a first group of switches that couple the machine to the battery; detecting a speed signal indicative of speed of the machine; and applying braking signals to a second group of switches that couple the machine to the battery, the braking signals having a duty cycle in response to the speed signal.

According to another exemplary embodiment, a motor control system includes a battery; a machine having a motor; an inverter having a plurality of switches to convert DC power from the battery to AC power for the machine in a motoring mode; a speed sensor coupled to the machine, the speed sensor to generate a speed signal indicative of machine speed; and a controller to apply braking signals to a group of the switches in a braking mode, the braking signals having a duty cycle in response to the speed signal.

Other aspects, features, and techniques of embodiments of the invention will become more apparent from the following description taken in conjunction with the drawings.

BRIEF DESCRIPTION OF THE DRAWINGS

Referring now to the drawings wherein like elements are numbered alike in the FIGURES.

DETAILED DESCRIPTION

Figure 1:
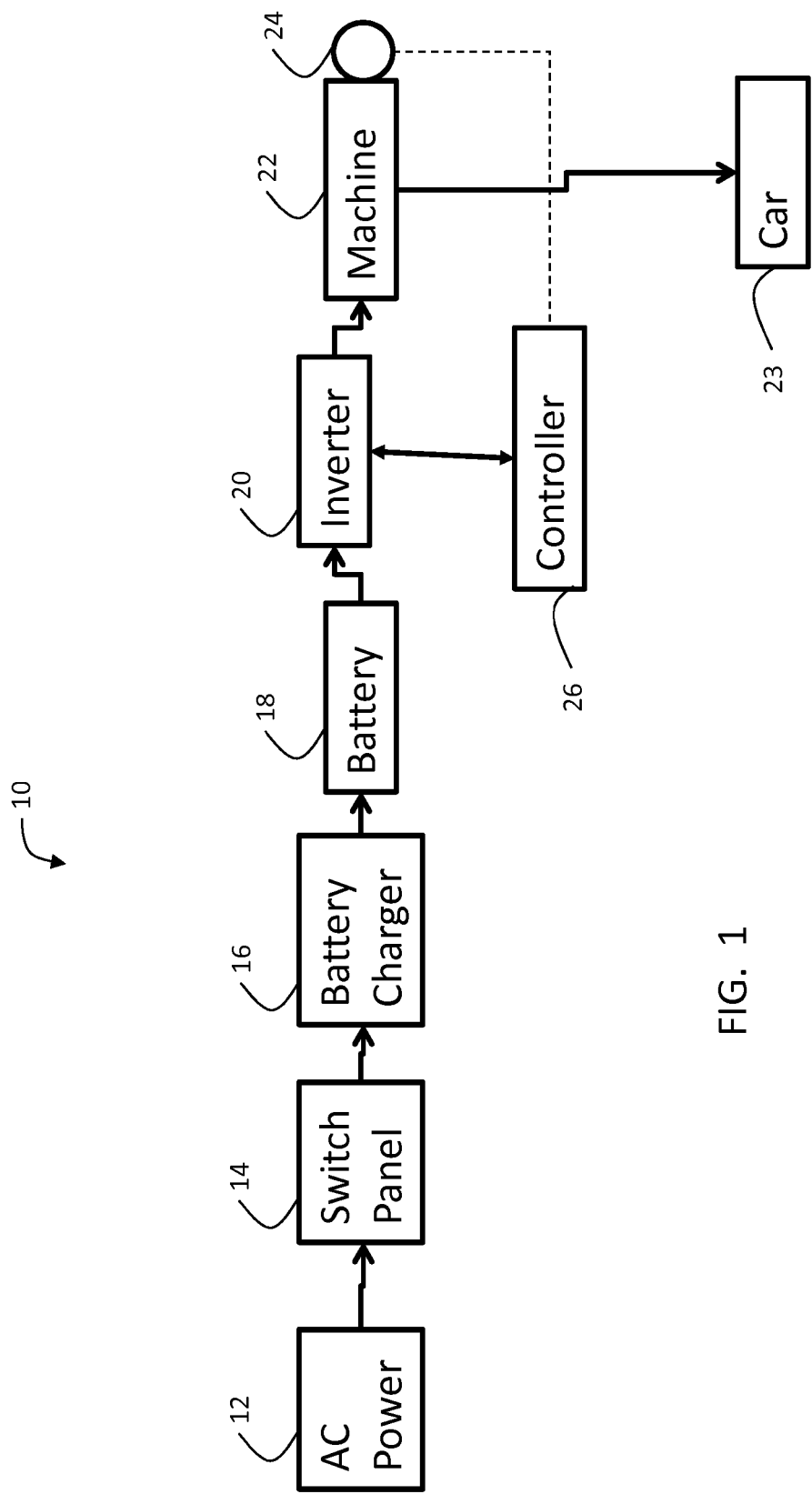
FIG. 1 is a block diagram of components of an elevator system in an exemplary embodiment.

FIG. 1 is a block diagram of components of an elevator system 10 in an exemplary embodiment. Exemplary embodiments are described with reference to an elevator system, but may be applied to other motor control systems. Elevator system 10 includes a source of AC power 12, such as an electrical main line (e.g., 230 volt, single phase). The AC power 12 is provided to a switch panel 14, which may include circuit breakers, meters, etc. From the switch panel 14, AC power is provided to a battery charger 16, which converts the AC power to DC power to charge battery 18. Battery 18 may be a lead-acid battery or other type of battery. Battery 18 inverter 20, which inverts DC power from battery 18 to AC drive signals, which drive machine 22 to impart motion to elevator car 23. The AC drive signals may be multiphase (e.g., three-phase) drive signals for a three-phase motor in machine 22. It is noted that battery 18 is the sole power source to the inverter 20, and the AC power 12 is not directly coupled to the drive unit 20.

A controller 26 is coupled to the inverter 20 to control inverter 20 over various modes. In motoring mode, controller 26 controls switches in inverter 20 to apply AC drive signals to machine 22 to impart motion to car 23. In regenerative mode, controller 26 controls switches in inverter 20 to convert AC power from machine 22 to DC power for charging battery 18. Regenerative mode may occur when an empty elevator car is traveling upwards or when a loaded elevator car is traveling downwards. In a braking mode, controller 26 controls switches in inverter 20 control speed of car 23. Braking mode may ensue upon opening of a safety chain in the elevator system, or other event. A speed sensor 24 (e.g., a rotary encoder) is mounted at machine 22 and provides a speed signal to controller 26 indicative of rotational speed of machine 22. Controller 26 may be implemented using a general-purpose microprocessor executing a computer program stored on a storage medium to perform the operations described herein. Alternatively, controller 26 may be implemented in hardware (e.g., ASIC, FPGA) or in a combination of hardware/software. Controller 26 may also be part of an elevator control system.

Figure 2:
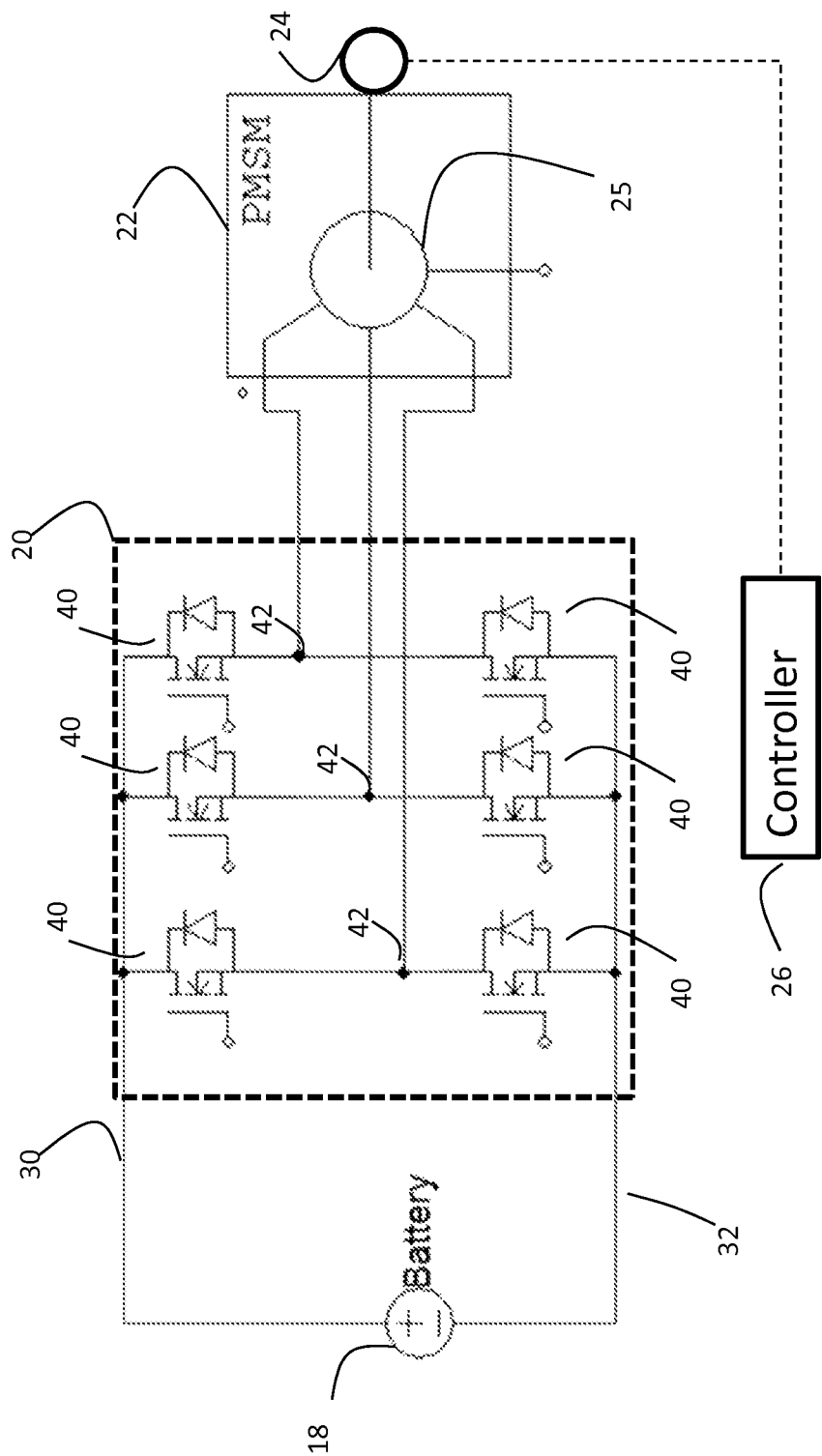
FIG. 2 depicts components of an elevator system in an exemplary embodiment.

FIG. 2 depicts components of elevator system 10 in an exemplary embodiment. Inverter 20 includes a first DC link 30 coupled to battery 18 (e.g., a positive DC voltage) and a second DC link 32 coupled to battery 18 (e.g., a negative DC voltage or ground). Inverter 20 uses switches 40 to generate AC drive signals for motor 25 of machine 22. Switches 40 may be MOSFET transistors, but it is understood other types of switches may be used. Each switch 40 includes a flyback diode across the drain-source terminals. Switches 40 are arranged in phase legs, each phase leg connected between the first DC link 30 and the second DC link 32. An AC terminal 42 is provided at a junction (e.g., source-drain junction) of the switches 40 in each phase leg. AC terminals 42 are coupled to motor windings of motor 25 in machine 22. In an exemplary embodiment, machine 22 includes a three-phase, permanent magnet synchronous motor 25. FIG.

2 depicts a three-phase inverter and three-phase motor, but embodiments are not limited to a particular number of phases.

FIG. 2 depicts operational state of inverter 20 during motoring mode or regenerative mode. During motoring mode, controller 26 provides control signals to turn switches 40 on and off to generate an AC drive signal at each AC terminal 42. The AC drive signal may be a variable frequency signal. During regenerative mode, controller 50 provides control signals to turn switches 40 on and off to convert AC power from machine 22 to DC power for charging battery 18.

Figure 3:
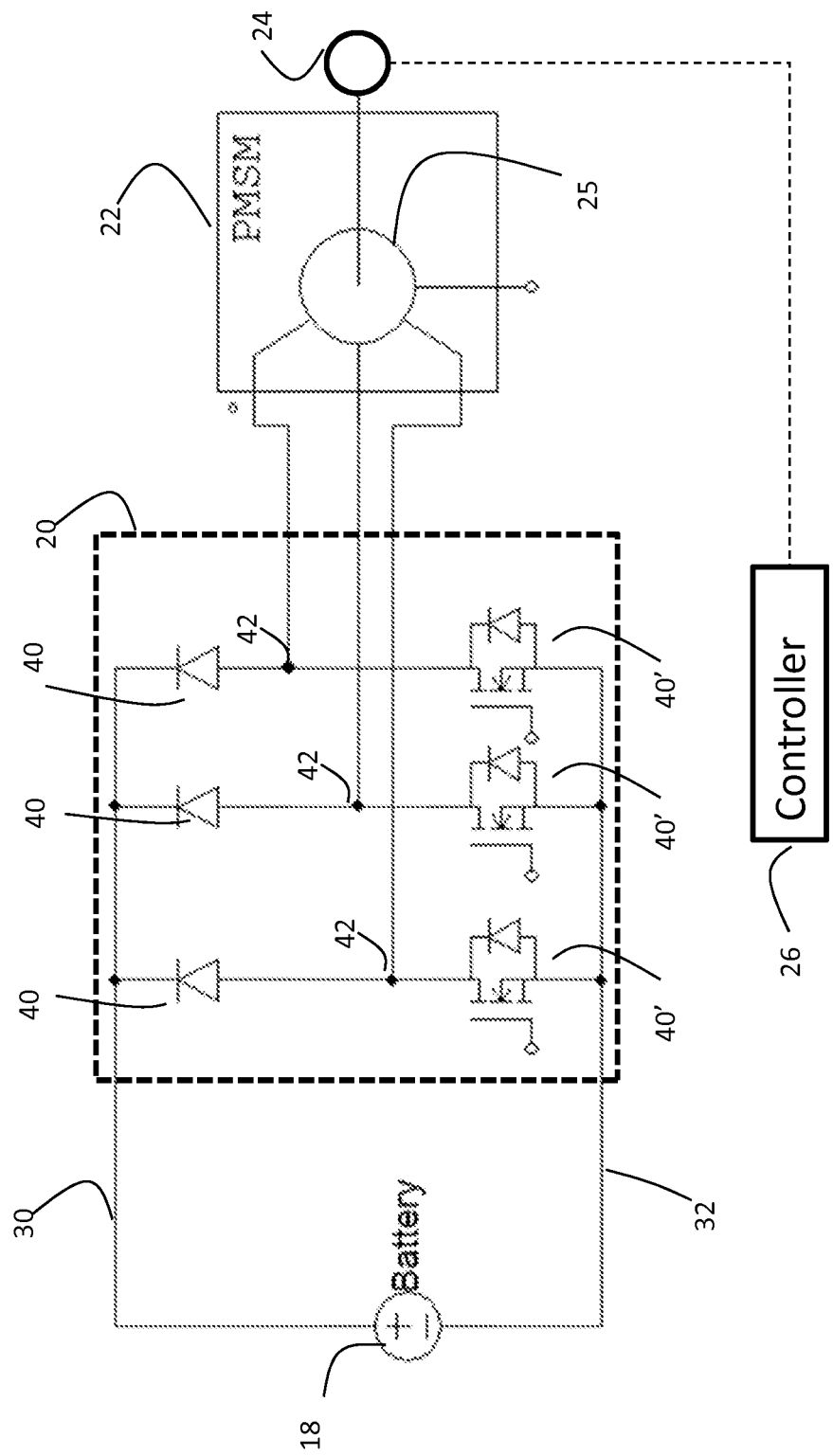
FIG. 3 depicts components of an elevator system in an exemplary embodiment.

FIG. 3 depicts operational state of inverter 20 during a braking mode. Braking mode may ensue upon opening of a safety chain in the elevator system, or other event. Braking mode involves a situation where a safety chain is removed, where the loss of safety chain changes the circuit such that no motoring force can be generated by the inverter 20. A first group of switches 40 between DC link 30 and AC terminals 42 may be opened (e.g., placed in a non-conductive state), to prevent motoring torque from being applied to machine 22. This results in the first group of switches being reduced to diodes (i.e., the flyback diodes). It is understood that other conditions may cause opening of the first group of switches.

In braking mode, a second group of switches 40' (i.e., the switches between the negative DC link 32 and the AC terminals 42) receive braking signals from controller 26 to selectively place switches 40' in a conductive or non-conductive state. When the second group of switches 40' are conductive, this shorts the windings of the motor 25 directly together to provide a braking force. The braking signals from controller 26 to switches 40' may have a duty cycle (e.g., a pulse width modulated signal). The braking signals applied to each switch 40' may have a common duty cycle, or switches 40' may receive braking signals having different duty cycles.

The duty cycle of the braking signals is determined by controller 26 in response to the speed signal from speed sensor 24. For example, when braking mode is initiated, the duty cycle may be about 0.5. As the speed signal reduces, the duty cycle may increase to about 1.0. This provides a smooth speed reduction to machine 22 and car 23. By varying the duty cycle of the braking signals in response to the speed signal, embodiments achieve braking for any load without an external braking resistor or braking relay.

Figure 4:
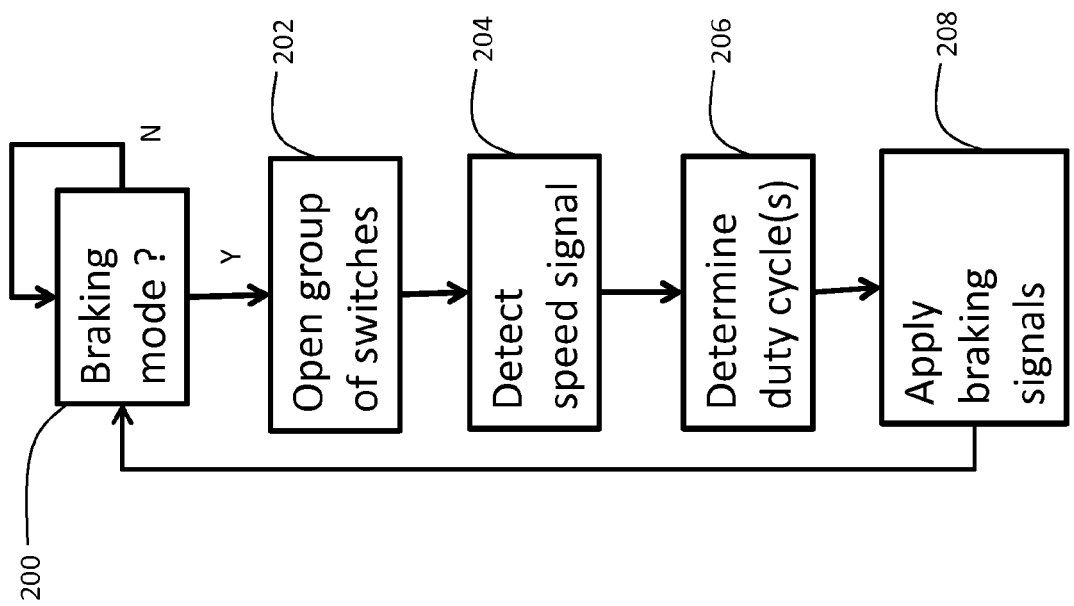
FIG. 4 is a flowchart of a process for applying braking signals in an exemplary embodiment.

FIG. 4 is a flowchart of a process for applying braking signals in an exemplary embodiment. The process may be implemented by controller 26. The process begins at 200, where controller 26 determines if the elevator system has entered braking mode. As described above, braking mode may be entered upon opening of an elevator safety chain or other event. At 202, the group of switches 40 connecting the positive DC link 30 to the AC terminals 42 are opened (i.e., rendered non-conductive).

Flow proceeds to 204 where controller 26 detects a speed signal from speed sensor 24. At 206, controller 26 determines one or more duty cycles of braking signals to be applied to a second group of switches 40' in response to the speed signal. The braking signals applied to switches 40' may have a common duty cycle or different duty cycles. Applying braking signals with equal duty cycle to the second group of switches 40' ensures the motoring capability is prevented and only a braking force is applied. At 208 the braking signals are applied to the second group of switches 40' to reduce speed of machine 22 and car 23.

Embodiments provide a number of advantages over existing designs. Varying the duty cycle of the braking signals in response to machine speed provides lower motor peak currents, which protects components, such as MOSFET diodes. Embodiments achieve braking for any load, even without an external braking resistor, by using only the motor self-resistance. Further, embodiments provide low braking speed for all load conditions. These advantages help reduce brake wear and also mitigate the undesired effects of a brake failing to engage. Although embodiments described herein relate to a motor control system for an elevator drive, the motor control system for applying a braking signal in response to motor speed may be used in other fields.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments and that various aspects of the invention, although described in conjunction with one exemplary embodiment may be used or adapted for use with other embodiments even if not expressly stated. Accordingly, the invention is not to be seen as being limited by the foregoing description, but is only limited by the scope of the appended claims.

The invention claimed is:

1. An elevator system comprising:
a battery;
a machine having a motor to impart motion to an elevator car;
an inverter having a plurality of switches to convert DC power from the battery to AC power for the machine in a motoring mode;
a speed sensor coupled to the machine, the speed sensor to generate a speed signal indicative of machine speed; and
a controller to apply braking signals to a group of the switches in a braking mode, the braking signals having a duty cycle in response to the speed signal.

2. The elevator system of claim 1 wherein:
the braking signals have a common duty cycle.

3. The elevator system of claim 1 wherein:
the braking signals have different duty cycles.

4. The elevator system of claim 1 wherein:
the group of switches is a subset of the plurality of switches.

5. The elevator system of claim 1 wherein:
the plurality of switches includes the group of switches and a further group of switches, the further group of switches being non-conductive during the braking mode.

6. The elevator system of claim 5 further comprising:
a first DC link connecting the battery to the further group of switches; and
a second DC link connecting the battery to the group of switches.

7. The elevator system of claim 6 wherein:
the first DC link has a positive DC voltage.

8. The elevator system of claim 1 wherein:
the braking mode is entered upon opening of an elevator safety chain.

9. The elevator system of claim 1 wherein:
the duty cycle of at least one of the braking signals increases with time in braking mode.

10. A method of controlling an elevator system having a machine that imparts motion to an elevator car and a battery, the method comprising:
determining if a braking mode has been entered;
in braking mode, opening a first group of switches that couple the machine to the battery;
detecting a speed signal indicative of speed of the machine; and
applying braking signals to a second group of switches that couple the machine to the battery, the braking signals having a duty cycle in response to the speed signal.

11. The method of claim 10 wherein:
the braking signals have a common duty cycle.

12. The method of claim 10 wherein:
the braking signals have different duty cycles.

13. The method of claim 10 wherein:
the braking mode is entered upon opening of an elevator safety chain.

14. The method of claim 10 wherein:
the duty cycle of at least one of the braking signals increases with time in braking mode.

15. A motor control system comprising:
a battery;
a machine having a motor;
an inverter having a plurality of switches to convert DC power from the battery to AC power for the machine in a motoring mode;
a speed sensor coupled to the machine, the speed sensor to generate a speed signal indicative of machine speed; and
a controller to apply braking signals to a group of the switches in a braking mode, the braking signals having a duty cycle in response to the speed signal.

* * * * *